(12) United States Patent
Hussain et al.

(10) Patent No.: US 12,286,248 B2
(45) Date of Patent: Apr. 29, 2025

(54) SPACE DEBRIS DETECTION AND MITIGATION WITH A NETWORK OF DEPLOYED OBSERVATORIES

(71) Applicants: Southern Cross Outreach Observatory Project (SCOOP), Smithfield (AU); Muhammad Akbar Hussain, Smithfield (AU); Muhammad Mehdi Hussain, Karachi (PK); Muhammad Waqar Haider, Lalor (AU); Muhammad Ayaz Hussain, Bottrop (DE)

(72) Inventors: Muhammad Akbar Hussain, Craigmore (AU); Muhammad Mehdi Hussain, Karachi (PK); Muhammad Waqar Haider, Lalor (AU); Muhammad Ayaz Hussain, Bottrop (DE)

( * ) Notice: Subject to any disclaimer, the term of this patent is extended or adjusted under 35 U.S.C. 154(b) by 0 days.

(21) Appl. No.: 18/399,447

(22) Filed: Dec. 28, 2023

(65) Prior Publication Data

US 2024/0278941 A1 Aug. 22, 2024

Related U.S. Application Data

(60) Provisional application No. 63/485,679, filed on Feb. 17, 2023.

(51) Int. Cl.
*B64G 3/00* (2006.01)
*F41H 13/00* (2006.01)

(52) U.S. Cl.
CPC ............ *B64G 3/00* (2013.01); *F41H 13/0062* (2013.01)

(58) Field of Classification Search
CPC .............................. F41H 13/0062; B64G 3/00
See application file for complete search history.

(56) References Cited

U.S. PATENT DOCUMENTS

| 11,799,262 | B2* | 10/2023 | Whitney | H01S 3/08 |
|---|---|---|---|---|
| 2012/0286098 | A1 | 11/2012 | Poulos | |
| 2013/0082146 | A1* | 4/2013 | Kofford | B64G 1/1078 |
| | | | | 244/158.7 |
| 2016/0264268 | A1* | 9/2016 | Aylmer | G21F 9/36 |
| 2017/0067996 | A1* | 3/2017 | Coyle | G01S 17/87 |
| 2017/0313447 | A1 | 11/2017 | Reed et al. | |
| 2024/0150044 | A1* | 5/2024 | Vance | B64G 1/68 |

FOREIGN PATENT DOCUMENTS

| CN | 104520914 A | 10/2016 |
|---|---|---|
| JP | H10147300 A | 6/1998 |
| WO | 2022249430 A1 | 12/2022 |

* cited by examiner

*Primary Examiner* — Arman B Fallahkhair (57) ABSTRACT

A space debris removing device, system and method are disclosed.
The system comprises a central server, a primary detection node, at least two secondary tracer nodes, the central server is configured to assign a tertiary node to track the debris with laser, wherein the tertiary node is configured to mark the debris being tracked with the laser, creating a laser illuminated target (LIT), a tertiary tracking unit deployed at the tertiary node, and a ground-based kilowatt laser system configured to pick up the LIT by using one or more optical sensors and tackle the debris with a high power laser beam.

13 Claims, 8 Drawing Sheets

SPACE DEBRIS DETECTION AND MITIGATION WITH A NETWORK OF DEPLOYED OBSERVATORIES

FIELD OF THE INVENTION

The present invention relates to a space debris removing device, system and a space debris removing method, and more specifically to a space debris removing device, system and a space debris removing method with a Network of Deployed Observatories.

BACKGROUND OF THE INVENTION

A space debris removing device and method with a Network of Deployed Observatories are in demand.

Current optical and radar-based space situational awareness initiatives and space debris mitigation methods are mainly aimed at preventing the creation of new debris by detecting and cataloging larger pieces of debris and implementing collision avoidance measures for satellites. A synchronized network of mobile observatories deployed over a vast area can detect small pieces of space debris, achieving great accuracy in the two line element sets (TLEs) through effective triangulation, enabling ground-based laser systems to deorbit individual debris through a concerted trace, track, and tackle sequence during a single pass over the detection field of the deployed network of observatories. Part of this sequence of detection, tracing and tracking of debris can also help in precise determination of the orbital elements of the resident space object (debris or satellites) to create a very high precision database of objects which can facilitate orbital Active Debris Removal (ADR) or execute avoidance maneuvers of active satellites. Such a network of mobile observatories can join ongoing global efforts to detect and remove space debris from Earth's orbit.

The present invention is intended to solve the problems associated with conventional devices and methods and provide improvements on these devices.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

A space debris removing device, system and method are disclosed.

The system comprises a central server, a primary detection node, at least two secondary tracer nodes, the central server is configured to assign a tertiary node to track the debris with laser, wherein the tertiary node is configured to mark the debris being tracked with the laser, creating a laser illuminated target (LIT), a tertiary tracking unit deployed at the tertiary node, and a ground-based kilowatt laser system configured to pick up the LIT by using one or more optical sensors and tackle the debris with a high power laser beam.

In one embodiment, the primary detection node includes a telescope system and optical sensors.

In some embodiments, the at least two secondary tracer nodes include a telescope system and optical sensors.

In some other embodiments, the tertiary node includes a telescope system and a tracking laser device.

In some other embodiments, the at least two secondary tracer units includes at least two observatories located at two separate nodes.

DETAIL DESCRIPTIONS OF THE INVENTION

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for removing or deorbiting a space debris (debris), embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device or user computing device, at least one network device, at least one sensor, and at least one actuator or razer device. Examples of the one or more client devices or user devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and user computing devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on.

Figure 1:
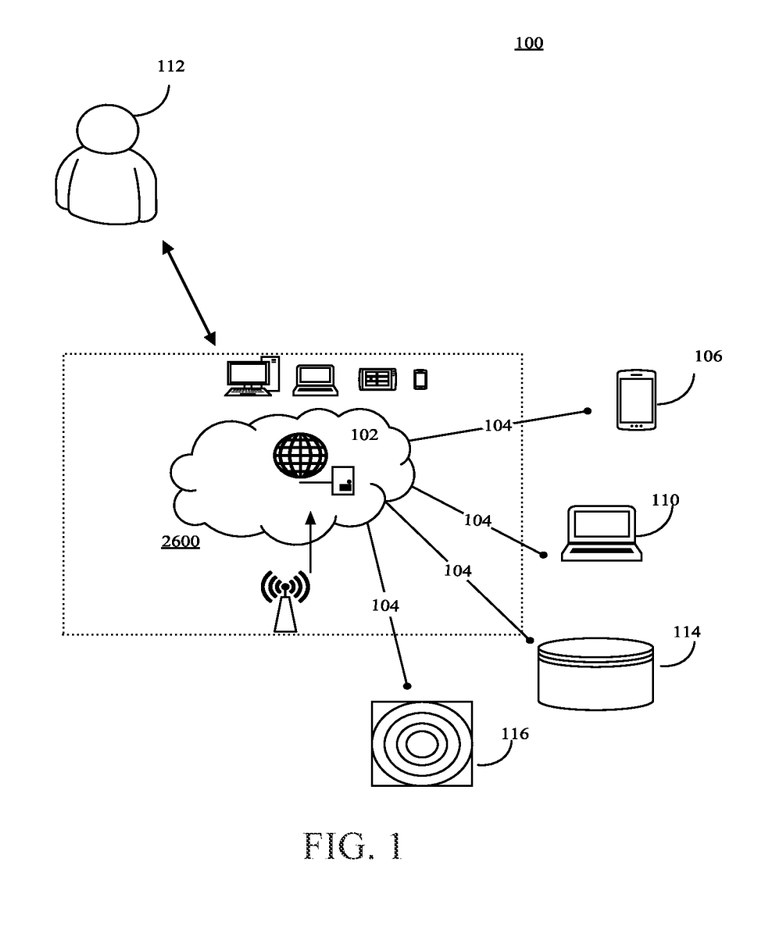
FIG. 1 is an illustration of an online platform consistent with various embodiments of the present disclosure.

FIG. 1 is an illustration of an online/mobile platform 100 consistent with various embodiments of the present disclosure. By way of non-limiting example, the online platform 100 for removing space debris may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, the databases 114 may be associated with government agencies. Further, users of the online platform 100 may include relevant parties such as, but not limited to, end-users, administrators, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2600.

Figure 2:
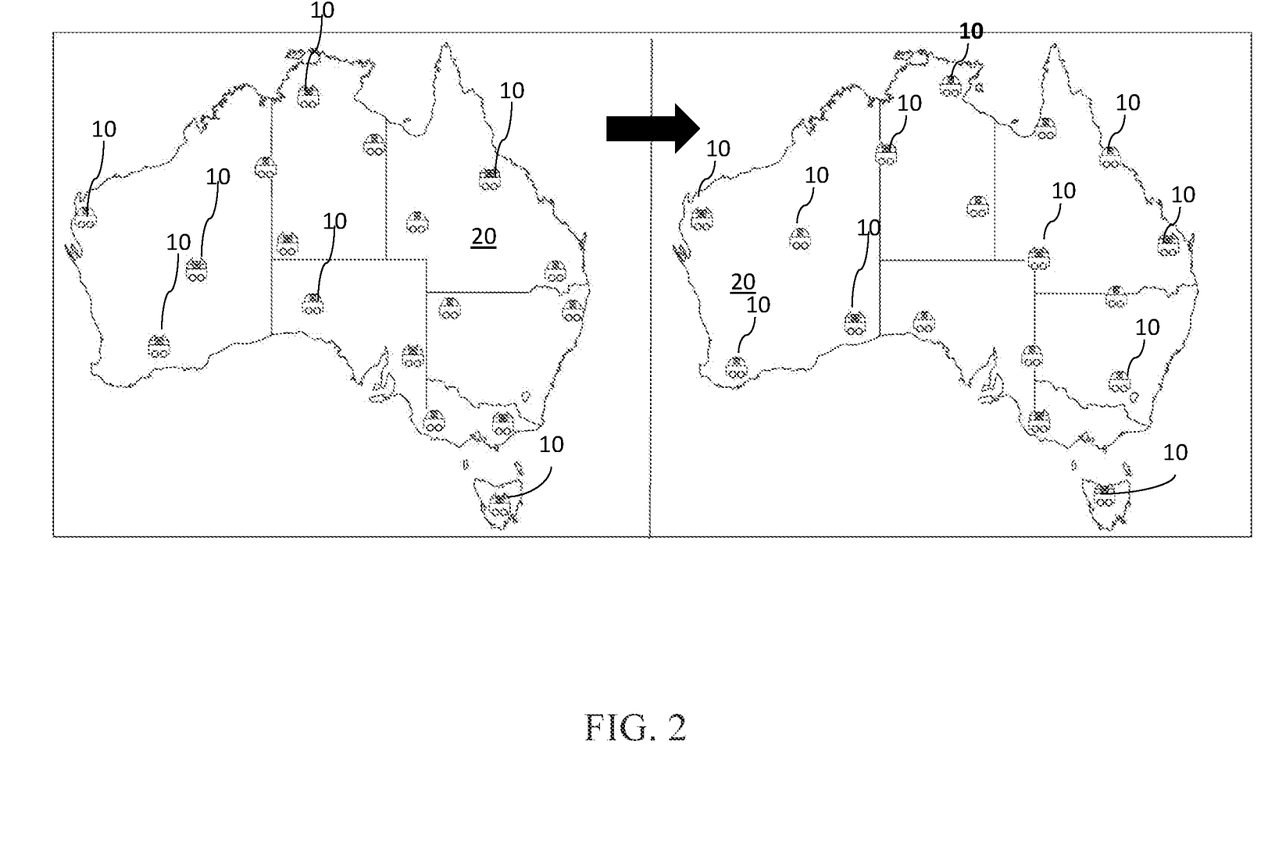
FIG. 2 is an illustration of multiple observatories at different locations showing that individual mobile observatories can rapidly move to new locations and deploy as per the need such as seeing conditions, ensuring seamless operability.

The present invention provides methods and systems for deorbiting or removing a space debris. Detection and cataloging of space debris are useful but insufficient to achieve a safe orbital environment for space infrastructure. Various innovative debris removal measures, such as the use of ground-based lasers to deorbit the debris or physical removal of debris through orbital ADR methods, are needed. These objectives can be achieved by acquiring a very high level of precision in the orbital parameters of the debris through triangulation by simultaneously observing an individual piece of debris from several locations hundreds of kilometers apart. Debris in LEO is likely to be at a very low angle in the sky or even beyond the horizon from the perspective of a fixed observatory in a particular location at any given time, making it extremely challenging and time-consuming to generate an comprehensive database by observing a small segment of the sky from the fixed location. A network of observatories deployed over a vast area, such as mobile observatories, will be able to achieve useful triangulation (See FIG. 2) from several locations, or 'nodes' 10. Such a network may be able to detect and locate several pieces of debris simultaneously and create a high-precision data. FIG. 2 is an illustration of multiple nodes 10 at different locations showing that individual mobile observatories can rapidly move to new locations and deploy as per the need such as seeing conditions, ensuring seamless operability. Australian map is used here as a rough size reference of the network.

Figure 3:
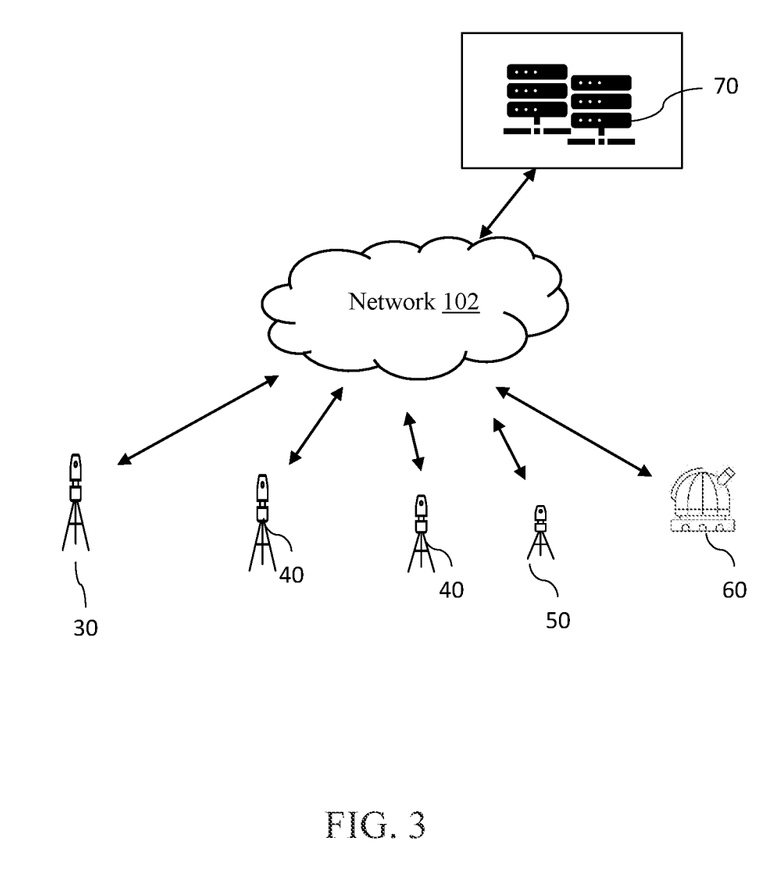
FIG. 3 is an illustration of individual mobile observatories connected to a central server through a network.
Figure 4:
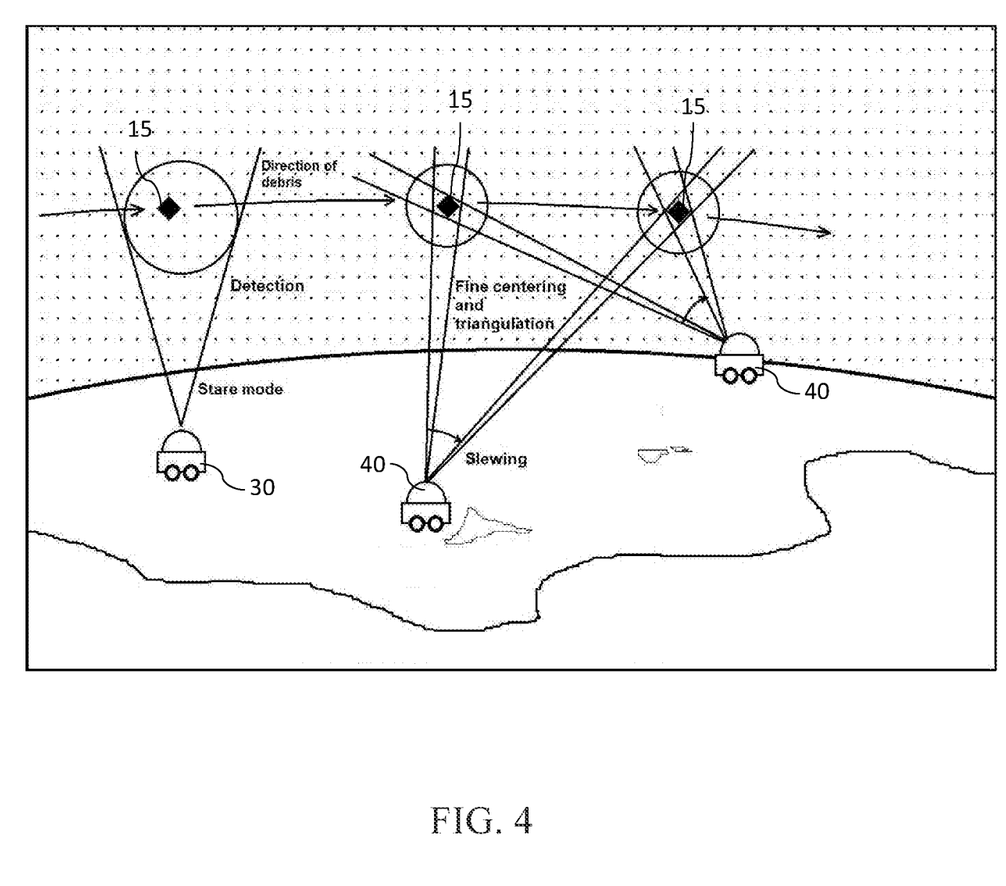
FIG. 4 is an illustration of individual mobile observatories at each node.
Figure 5:
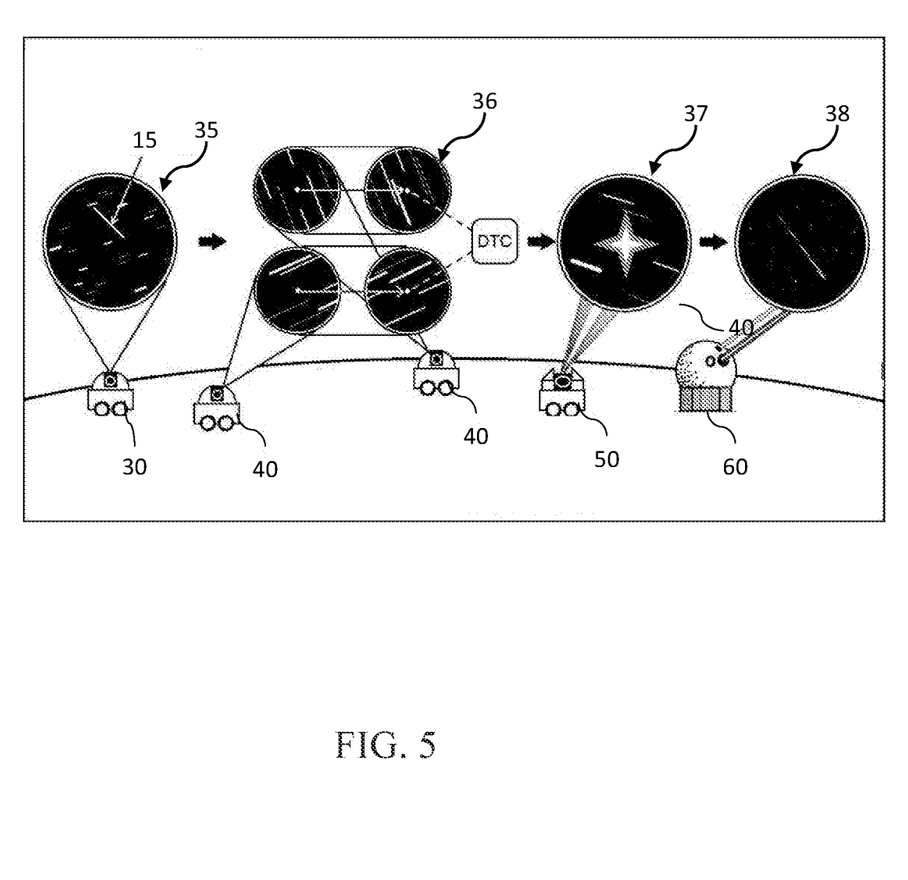
FIG. 5 is a diagrammatic representation of the Trace Track and Tackle Sequence.

As shown in FIGS. 3-5, the present invention may comprise a primary detection unit 30, a plurality of secondary tracer units 40, a tertiary tracking unit 50, a plurality of ground based tackling de-orbiter units 60. The primary detection unit 30, the plurality of secondary tracer units 40, the tertiary tracking unit 50, the plurality of ground based tackling de-orbiter units 60 may each include one or more computing devices and computing systems. The present invention may also include nodes 10 that are connection points in a communications network. Such nodes may be connected wirelessly and may include one or more computing devices and systems.

In the present invention, the entire network of mobile observatories (or nodes 10) will comprise several sub-networks working independently but controlled and regulated by a central server 70. Each sub-network will consist of four (or more) nodes 10 with deployed observatories. Each of these nodes 10 in a sub-network will have more than one assigned locations. Depending upon the weather and other conditions, mobile observatory units can relocate to an alternate node location and re-deploy. In each sub-network, one node 10 will have a telescope to cover a large area of the sky and detect a previously unknown piece of space debris within its field of view (FOV). Two (or more) of the nodes 10 will have one observatory each to trace and triangulate on the detected piece of debris 15. The final node 10 in the sub-network will have a telescope to zero in on the triangulated piece of space debris 15 in LEO at high magnification and track it with laser. The nodes 10 in the individual sub-networks may overlap so that each node 10 may have more than one observatory working for different sub-networks independent of each other.

In one embodiment, the telescopes in individual nodes 10 can be remotely connected and synchronized through a central server 70 handling the operation of the entire network, as shown in FIG. 3, through data fusion, meaning that the network elements will essentially work in unison as a single giant instrument. (See FIG. 2)

In some embodiments, the network will also have a small number of high power laser units at fixed locations to deorbit the tracked piece of debris based on the input from the sub-networks.

Each sub-network of mobile observatories of the present invention is configured to initiate a trace, track, and tackle sequence of detection and generation of trajectory data to execute deorbiting of the space debris in LEO with the use of a ground-based laser as its primary objective. The high precision in the orbital trajectory or parameters of the space debris obtained through the trace, track and tackle sequence will also help in effective avoidance manoeuvres of active satellites or execution of orbital ADR using debris removal satellites.

FIG. 4 is a diagrammatic representation of the Trace Track and Tackle Sequence. An observatory with a parked Field of view (FOV) picks up a debris 15 of interest and establishes a preliminary trajectory at 35. Tracer nodes trace out a Dynamic Trajectory Code through fine centering and triangulation at 36. At 37, laser illuminated target is created with tracking laser. At 38, debris is deorbited with powerful tracking laser.

Figure 6:
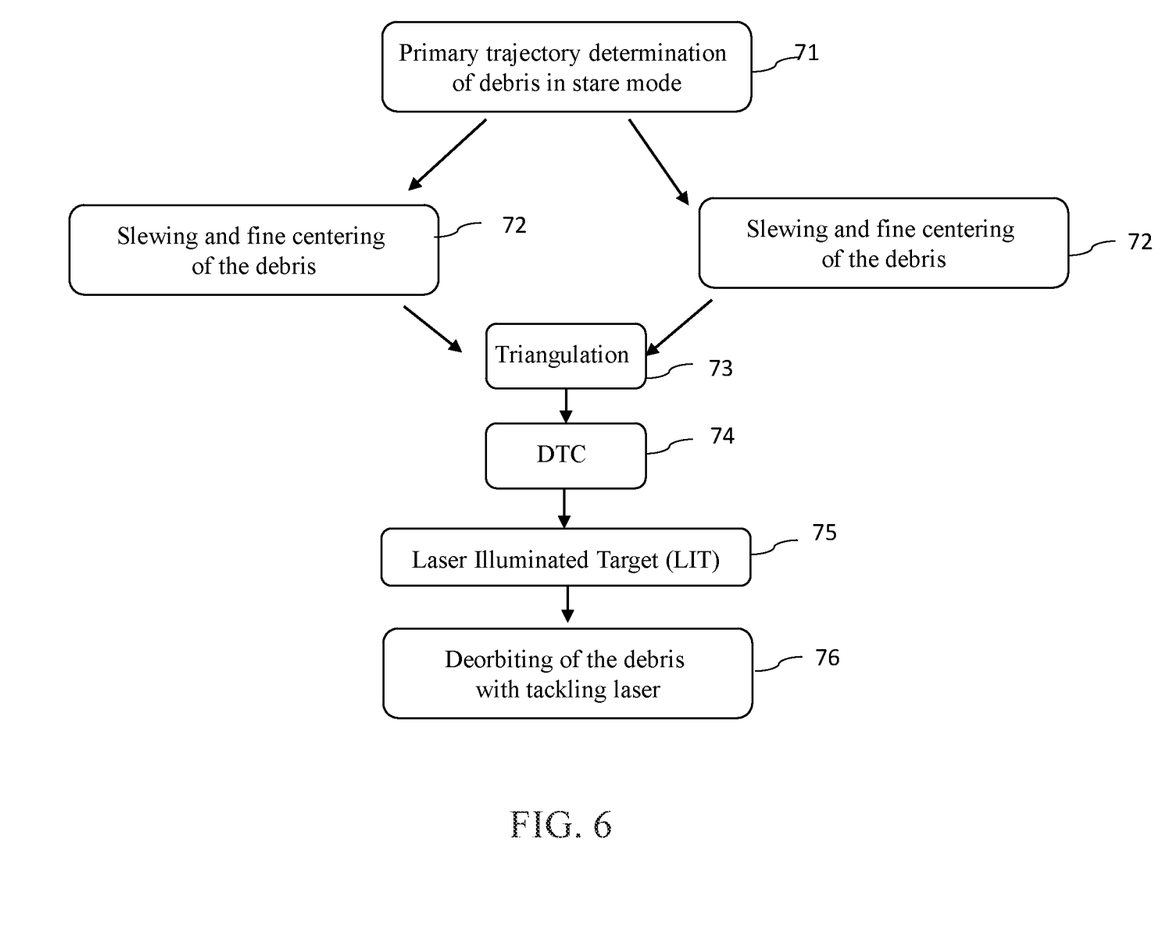
FIG. 6 is a block diagram illustrating the Trace Track and Tackle Sequence.
Figure 7:
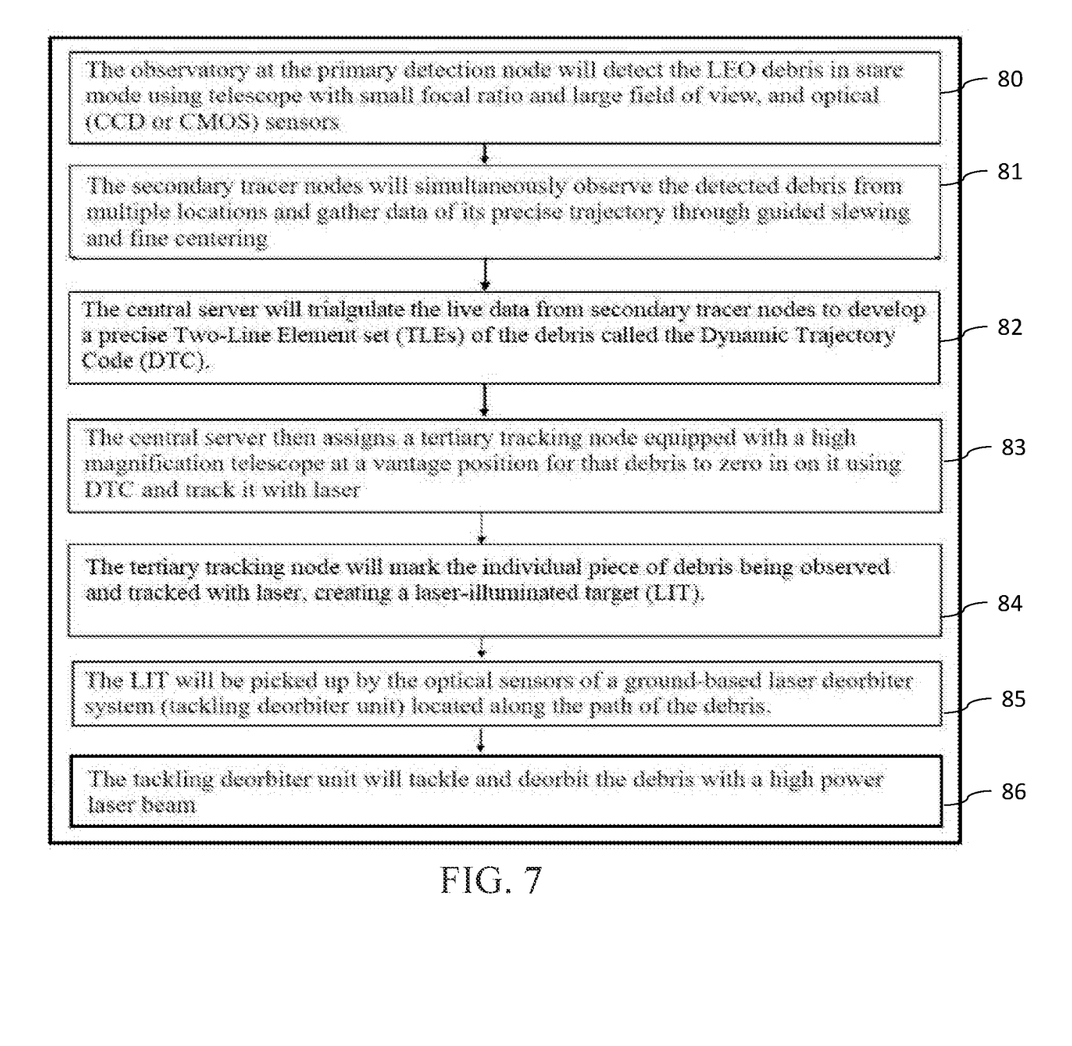
FIG. 7 is a flowchart illustration of one embodiment of a method of the present invention.

As shown in FIG. 6 and FIG. 7, the operation of the present invention may comprise the following steps: at 80, the observatory at the primary detection node (having primary detection unit 30) will detect LEO debris using optical (CCD or CMOS or their variants) sensors that can be assisted by dynamic imagery using event-based sensors. This information will help the observatories in the secondary nodes (having secondary tracer unit 40) to trace out a precise trajectory of the debris through triangulation while simultaneously observing it from multiple locations at 81.

At 83, the central server 70 will then assign a tertiary node (having tertiary tracking unit 50) equipped with a high-magnification telescope at the vantage position for that debris to zero in on it and track it with a laser beam, creating a laser-illuminated target (LIT) at 84.

At 85, this target will be picked up by the optical sensors of the ground-based de-orbiter laser system 60 located along its path. At 86, the de-orbiter laser unit 60 will tackle the debris with a high-power laser beam. The vast array of the mobile observatory network spread over a huge area will be able to tackle and deorbit a large number of small space debris (debris) through executing the trace, track, and tackle sequence. The high precision orbital data of space debris will also help orbital ADR methods.

Primary Detection Unit 30

The main objective of a primary detection unit 30 is to detect previously unknown and uncatalogued pieces of debris and determine their approximate trajectories. It will be equipped with a telescope of very short focal ratio for a wide-angle initial detection of LEO debris using a large CCD or CMOS sensor with large size pixels either manufactured as such, or through joining the pixels using a technique called binning, or both. It will detect a previously unknown debris as a streak, the length of which depends upon its orbital altitude, slant range and exposure time, and determine its preliminary orbital trajectory. This will constitute the primary detection unit.

The integration time on a single pixel of a regular sensor through a telescope of standard focal ratio is extremely short for a moving target such as space debris 15, and may be insufficient for its detection. The primary detection unit telescope will have integrated features to increase the detectability of a very faint piece of debris 15. This includes the use of a telescope of a medium aperture with very small focal ratio, the use of very large sensors having large pixels, using sensors of the highest quantum efficiency, and virtual joining of the pixels through the use of binning technique. In some embodiments, Event-Based Sensors may also be used to assist the detection of faint moving targets. The entire purpose of such a configuration is to increase the field of view, increase the integration time of the debris 15 over each pixel, and enhance the sensitivity of each pixel set. This will sacrifice the resolution in exchange for an increase in detectability of the debris 15.

Secondary Tracer Units 40

The main objective of secondary tracer units 40 is to achieve triangulation by simultaneously observing a single piece of debris 15 from their respective locations hundreds of kilometers from each other.

These Secondary tracer units 40 will be a minimum of two observatories located at two separate nodes 10; each equipped with a short focal ratio telescopes for further refinement of the calculated trajectory of the fast moving debris 15 by the primary detection unit 30. These telescopes will have relatively less short focal ratios than the primary detection unit 30. Their aim is to zero-in on the estimated debris location on the sky and slew along its trajectory based on the information provided by the primary detection unit 30. These telescopes will slew along the acquired trajectory and bring the debris image to a single fixed pixel through fine centering. The slewing data from the mounts of the telescopes of each secondary tracer unit 40 while maintaining fine centering, will be triangulated in real-time by the central server 70 to determine an ultra-precise trajectory of the debris 15, which will be a highly precise form of TLEs of the observed debris 15, designated as the Dynamic Trajectory Code (DTC) in the Trace, Track and Tackle Sequence.

Tertiary Tracking Unit 50

This mobile observatory unit 50, Tertiary tracking unit 50, will be deployed at a node 10 a further few hundred kilometers away in the sub-network. In some embodiments, the tertiary tracking unit 50 may include a telescope system and a tracking laser device known in the art. Equipped with a system of telescope and a tracking laser on a mobile platform, this Tertiary tracking unit 50 will be designed to zero-in on the debris 15 as directed by the DTC to enable the tracking laser to illuminate and mark the debris while tracking it, creating the laser illuminated target.

A telescope and sensor of higher magnification and resolution may be desirable to detect slightest deviation of the target from the laser beam, so a rapid course correction can be implemented to avoid losing the target.

Ground Based Tackling De-Orbiter Units 60

These are laser units at fixed locations that will pick up the spectral signature of the tracked laser-illuminated debris 15 and direct a powerful laser beam to the exact calculated location of the debris 15 assisted by the feedback from optical sensors and the use of adaptive optics. The aim of this laser is to slow down the debris using photon pressure and the drag from the plasma cloud formed as a result of ablation, causing it to deorbit.

Central Server and the Internet of Things

Each sub-network will be connected to a central server 70 through a high-speed internet with a low latency period and synchronized with Network Time Protocol. The central server (server) 70 will process the information from each node 10, including its location coordinates and parameters, and that of a piece of debris under observation and relay the processed information from one node 10 to the other nodes in the network. The central server 70 will utilize the data from all the units and nodes in the sub-networks and synchronize all the elements of the entire network through data fusion and enable them to work in unison, essentially converting the entire network of observatories into a single giant instrument. In some embodiments, one or more users 112 may be connected to the server 70 and other computing devices and systems and network 102 to enable the communication between the users 112 and systems of the present invention.

In preferred embodiment, the present invention includes a system comprising a central server 70, a primary detection node 10 having a primary detection unit 30 that detects a debris 15 using one or more optical sensors, the primary detection node 10 is communicatively connected to the central server 70, at least two secondary tracer nodes 10 communicatively connected to the central server 70, the at least two secondary tracer nodes 10 include at least two secondary tracer units 40, the central server 70 is configured to assign a tertiary node 10 (having tertiary tracking unit 50) to track the debris 15 with laser, wherein the tertiary node 10 (having tertiary tracking unit 50) is configured to mark the debris being tracked with the laser, creating a laser illuminated target (LIT), a tertiary tracking unit 50 deployed at the tertiary node 10, the tertiary tracking unit 10 is communicatively connected to the central server 70, and a ground-based kilowatt laser system 60 configured to pickup the LIT by using one or more optical sensors and tackle the debris with a high power laser beam.

Description of the Operation

Creation of a Three-Dimensional Coordinate System of the LEO Environment (the Grid)

To begin with, the entire LEO environment above the vast area with deployed observatories network will be assigned a three-dimensional coordinate system in the form of a pixelation matrix (the Grid) with the help of an accepted reference system such as the International Terrestrial Reference System (ITRS) or a more regional system such as Australian Geospatial Reference System (AGRS, for a network deployed across Australia), and a global spherical coordinate system. Here the 'pixel' refers to the cubical volume of space of set dimensions in the three-dimensional coordinate system to assign the exact location of the debris in space for a given point in time. The accurate altitude for any given land coordinate from a regional or International Terrestrial Reference Frame will be pivotal in defining the exact pixel location for any given altitude of LEO down to the accuracy of a few centimeters or less. In order to accommodate any limitations in the accuracy of the hardware (telescopes, sensors, and mounts) in detecting and locating a single piece of debris, atmospheric seeing conditions, the speed of debris 15, and the information delay due to the speed of light, a single pixel in the Grid can be designated as a cube in space with 20 meters sides (with a volume of 8000 cubic meters). For reference, one 20 m pixel will impart an angle of 2.06 arc seconds at a distance of 2000 km from the observer.

The observatories (in any nodes 10) will read the location of any detected debris 10 against a preloaded three-dimensional map based on the coordinate system in its software and assign the location as a cube as the debris 15 moves through the matrix from one cube to another. Individual pieces of debris 15 will be assigned a cube or pixel designation code against its location in the matrix which will be continuously updated in real-time along its trajectory as the debris moves through the matrix. In this way, despite its size, every single piece of debris will be treated as a single 20 m cube (or any other pre-determined size) with a unique pixel designation for any given moment in time. Triangulation of a single piece of debris from more than one location will help calculate a highly precise trajectory which will lead the central server to generate a precise anticipated trajectory or the Dynamic Trajectory Code (DTC). The DTC is an anticipated sequence of rapidly changing location coordinates given to a particular piece of debris 15 being traced, tracked and tackled and will help anticipate the exact location of the debris 15 in the Grid for any given moment in time during its transit through LEO over the detection field of the mobile observatories network. Once a DTC is generated, the piece of debris 15 will become essentially locked and its pixel position in the Grid can be accurately traced down to any given millisecond for the next several minutes.

Operation

Below is an example of the operation of a single sub-network in a trace, track and tackle sequence. (See FIG. 5: Diagrammatic representation of the Trace Track and Tackle Sequence)

The mobile observatories are deployed at the designated nodes 10 based on the location with the most suitable forecast with good seeing and establish an uplink with the global high-speed internet such as Starlink for a fast and seamless connectivity. The units (30, 40, 50, 60) then update the central server 70 with their live parameters, including the exact location coordinates, altitudes, orientation, and atmospheric and sky conditions. This data helps determine a unique spatiotemporal signature for a particular unit upon which all the calculations are based for that unit (30, 40, 50, 60) or node 10. The central server 70 then synchronizes all the units (30, 40, 50, 60) to create a single virtual instrument, integrating the parameters such as the geospatial coordinates of each node 10 and the latency in the data transmission and processing. As shown in FIG. 6, At 71, at the start of the operation, the telescope at the primary detection node (having primary detection unit 30) parks its field of view in a fixed stare mode at one location in the sky, preferably the zenith. The very short focal ratio ensures the field of view covers a wide area in the sky. Within seconds it picks up a few previously uncatalogued pieces of debris through its optical sensor. The detected debris 15 appear as streaks of various lengths, brightness and directions in the stationary field of view, preferably parked towards the zenith. The most suitable debris 15 is classified and selected using machine learning algorithms. The length of its streak for the known exposure time helps determine the altitude, and its slant range helps determine its corresponding ground coordinate. It cannot pinpoint its exact location down to a single space pixel or cube if binning has been applied to enhance the detectability of the debris 15, but it can generate the initial estimates of its velocity vector, based on the length of the streak over a given time, and its slant range. This information is relayed to the central server 70. The preliminary trajectory data from the primary detection node (primary detection unit 30) is sufficient enough to direct the telescopes at the secondary tracer nodes (secondary tracer unit 40) to point at the expected location of the debris 15 for that given time and slew to match its trajectory.

At 72, the slewing of the telescopes of the secondary tracer nodes (secondary tracer unit 40) matches the approximate motion of the debris 15 in their fields of view enabling longer integration time on each pixel on the sensor. Once the debris 15 is detected by the sensor of the secondary tracer node (secondary tracer unit 40), it will lock it in the view through fine centering and start generating data to refine the precision of its location and trajectory.

The central server 70 processes the live slewing data from simultaneous observation of the same piece of debris 15 from secondary tracer nodes (secondary tracer unit 40) at multiple locations and generates the DTC 74 for that debris 15 through triangulation 73 of the acquired data. The trajectory of the moving debris 15 is now locked.

The central server 70 now directs the system at the tertiary tracking node (tertiary tracking unit 50) to zero-in on the calculated and anticipated position of the debris 15 as directed by the DTC and track the detected debris 15 using laser. This system will be equipped with fast feedback loop sensors to perform self-integrated course correction of the laser to ensure it exactly matches the DTC and illuminate the debris 15 at 75. The debris 15, illuminated as a laser illuminated target (LIT) is now several hundred times brighter than its original brightness, giving it a unique spectral signature, which is then picked up by the tackling de-orbiter unit 60 equipped with a kilowatt or megawatt laser system and adaptive optics. This laser system aims a pulsed beam of high-power laser directly at the illuminated debris 15 and ablates its leading surface creating a vapour and ion cloud at 76. This cloud is blown backwards due to the photon pressure of the laser which creates a drag on the piece of debris 15, causing it to slow down. Within a few seconds, the debris 15 will be slowed down enough that its orbit will start to decay. It won't be long until it enters the upper atmosphere and burns up completely due to the atmospheric drag.

Due to their intensity, these laser beams will be subject to atmospheric effects such as Raman Scattering and thermal blooming which can reduce their effectiveness. This problem can be solved by the use of relatively lower wattage pulsed lasers from multiple sites which can zero-in on a single piece of debris 15 simultaneously, with intensity enhanced through constructive interference at the target altitude. Airborne laser units in the stratosphere such as specially designed aircrafts can also be envisioned in the future which will avoid most of the thick atmosphere and increase the accuracy of the operation.

The aim is to keep the cross section of the tackling laser beam to less than 20 meters across at the target altitude to be able to maintain enough photon energy density delivered to the debris to heat it up and create a vapor cloud within a matter of seconds. Choice of wattage and type of laser will be crucial. (See FIG. 5: Flowchart summary of the Trace Track and Tackle Sequence)

Figure 8:
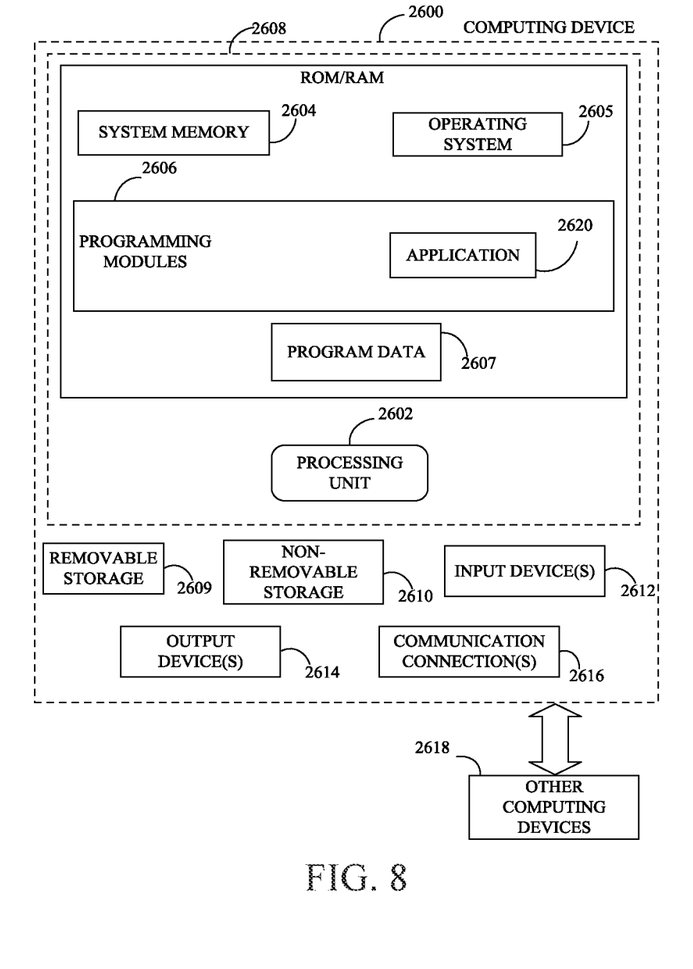
FIG. 8 is a block diagram of a computing device for implementing the methods disclosed herein, in accordance with some embodiments.

With reference to FIG. 8, a system consistent with an embodiment of the disclosure may include a computing device or cloud service, such as computing device 2600. In a basic configuration, computing device 2600 may include at least one processing unit 2602 and a system memory 2604. Depending on the configuration and type of computing device, system memory 2604 may comprise, but is not limited to, volatile (e.g. random-access memory (RAM)), non-volatile (e.g. read-only memory (ROM)), flash memory, or any combination. System memory 2604 may include operating system 2605, one or more programming modules 2606, and may include a program data 2607. Operating system 2605, for example, may be suitable for controlling computing device 2600's operation. In one embodiment, programming modules 2606 may include image-processing module, machine learning module, etc. Furthermore, embodiments of the disclosure may be practiced in conjunction with a graphics library, other operating systems, or any other application program and is not limited to any particular application or system. This basic configuration is illustrated in FIG. 8 by those components within a dashed line 2608.

Computing device 2600 may have additional features or functionality. For example, computing device 2600 may also include additional data storage devices (removable and/or non-removable) such as, for example, magnetic disks, optical disks, or tape. Such additional storage is illustrated in FIG. 8 by a removable storage 2609 and a non-removable storage 2610. Computer storage media may include volatile and non-volatile, removable and non-removable media implemented in any method or technology for storage of information, such as computer-readable instructions, data structures, program modules, or other data. System memory 2604, removable storage 2609, and non-removable storage 2610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2600. Any such computer storage media may be part of device 2600. Computing device 2600 may also have input device(s) 2612 such as a keyboard, a mouse, a pen, a sound input device, a touch input device, a location sensor, a camera, a biometric sensor, etc. Output device(s) 2614 such as a display, speakers, a printer, etc. may also be included. The aforementioned devices are examples and others may be used.

Computing device 2600 may also contain a communication connection 2616 that may allow device 2600 to communicate with other computing devices 2618, such as over a network in a distributed computing environment, for example, an intranet or the Internet. Communication connection 2616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2604, including operating system 2605. While executing on processing unit 2602, programming modules 2606 may perform processes including, for example, one or more stages of methods, algorithms, systems, applications, servers, databases as described above. The aforementioned process is an example, and processing unit 2602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

What is claimed is:

1. A system for detection and mitigation of space debris comprising: a central server, a primary detection node having a primary detection unit that detects a debris using one or more optical sensors, the primary detection node is communicatively connected to the central server, at least two secondary tracer nod es communicatively connected to the central server, the at least two secondary tracer nodes include at least two secondary tracer units, the central server is configured to assign a tertiary node to track the debris with a first laser beam, wherein the tertiary node is configured to mark the debris being tracked with the first laser beam, creating a laser illuminated target (LIT), a tertiary tracking unit deployed at the tertiary node, the tertiary tracking unit is communicatively connected to the central server, and a ground-based kilowatt laser system configured to pick-up the LIT by using one or more optical sensors and tackle to deorbit the debris with a high power laser beam of the ground-based kilowatt laser system.

2. The system as claimed in claim 1, wherein the one or more optical sensors are assisted by one or more event-based sensors.

3. The system as claimed in claim 2, wherein the primary detection node includes a telescope system and optical sensors.

4. The system as claimed in claim 2, wherein the at least two secondary tracer nodes include a telescope system and optical sensors.

5. The system as claimed in claim 2, wherein the tertiary node includes a telescope system and a tracking laser device.

6. The system as claimed in claim 1, wherein the first laser beam is emitted by a high-power long-range laser.

7. The system as claimed in claim 1, wherein the at least two secondary tracer units includes at least two observatories located at two separate nodes.

8. The system as claimed in claim 1, wherein the at least two secondary tracer units
are at least a hundred kilometers apart.

9. A method for detection and mitigation of space debris comprising: detecting, by using a primary detection unit, a piece of debris using optical sensors from a primary detection node, tracing, by using a central server and at least two secondary tracer units, a location of the piece of debris through triangulation, assigning, by using the central server, a tertiary node, zeroing on a debris by using a tertiary tracking unit with a dynamic trajectory code, marking, by using a first laser beam emitted by a high-power long-range laser, the piece of debris being observed and tracked, thereby creating, by using the high-power long-range laser, a laser-illuminated target, picking up, by one or more optical sensors of a ground-based kilowatt laser system, the laser-illuminated target, and deorbiting, by using a high-power laser beam of the ground-based kilowatt laser system, the piece of debris.

10. The method as claimed in claim 9, wherein the tertiary node is equipped with a telescope system at the vantage position.

11. The method as claimed in claim 9, wherein the at least two secondary tracer units are at least a hundred kilometers apart.

12. A non-transitory computer readable medium containing computer-readable instructions stored therein for causing a computer processor to perform operations to detect and mitigate space debris, the operations comprising: detect, by using a primary detection unit, a piece of debris using optical sensors from a primary detection node, trace, by using a central server and at least two secondary tracer units, a location of the piece of debris through triangulation, assign, by using the central server, a tertiary node, zero in on a debris by using a tertiary tracking unit with a dynamic trajectory code, mark, by using a first laser beam emitted by a high-power long-range laser, the piece of debris being observed and tracked, create, by using the first laser beam of the high-power long-range laser, a laser-illuminated target, pick up, by one or more optical sensors of a ground-based kilowatt laser system, the laser-illuminated target, and deorbit, by using a high-power laser beam of the ground-based kilowatt laser system, the piece of debris.

13. The non-transitory computer readable medium as claimed in claim 12, wherein the tertiary node is equipped with a telescope system at the vantage position.

* * * * *